United States Patent [19]
Nguyen et al.

[11] Patent Number: 5,455,956
[45] Date of Patent: Oct. 3, 1995

[54] CONNECTION TREE REARRANGEMENT METHOD AND SYSTEM FOR REARRANGEBLY-BLOCKED DSM NETWORKS

[75] Inventors: Brian H. Nguyen, Mesquite; Dung T. Huynh, Plano, both of Tex.

[73] Assignee: Alcatel Network Systems, Richardson, Tex.

[21] Appl. No.: 999,288

[22] Filed: Dec. 30, 1992

[51] Int. Cl.$^6$ .......................... G06F 11/28; G06F 13/36; G06F 13/20; G06F 13/14

[52] U.S. Cl. .................. 395/800; 364/228; 364/229.5; 364/230.5; 364/240.1; 364/240.2; 364/240.5; 364/240.7; 364/241.9; 364/244.8; 364/DIG. 1; 364/DIG. 2; 395/200.02; 340/825.03; 340/827

[58] Field of Search .................. 340/825.31, 826, 340/825.02, 825.03, 827, 825.14; 395/800, 200, 325, 250, 500, 275, 375, 650, 575, 275, 775; 364/DIG. 1, DIG. 2; 370/94.1, 58.1, 94.3

[56] References Cited

U.S. PATENT DOCUMENTS 4,710,916  12/1987  Amstutz et al. ................ 370/58
4,825,206  4/1987  Brice, Jr. et al. ............... 340/825.02
5,084,870  1/1992  Hutchison et al. ............... 370/94.1

*Primary Examiner*—Eric Coleman
*Assistant Examiner*—Daniel H. Pan
*Attorney, Agent, or Firm*—Baker & Botts

[57] ABSTRACT

A method and system construct an O-tree and I-tree for a rearrangeably-blocked digital symmetrical matrix (DSM) network. The method includes the steps of receiving a plurality of parameters including a tree forming instruction for forming the I-tree and O-tree, an input switch parameter, an output switch parameter, and middle switch parameters. From these parameters, the method and system yield a set of feasible nodes for rearranging the DSM network to make the desired connection. The method and system are modified to terminate at the first feasible node of a modified I-tree or a modified O-tree. Also, both a rearrangement method and system and a DSM network control method and system are provided that use either the I-tree and O-tree construction process or the modified I-tree and modified O-tree construction process. Furthermore, a parallel rearrangement algorithm is provided for even further enhancement.

7 Claims, 4 Drawing Sheets

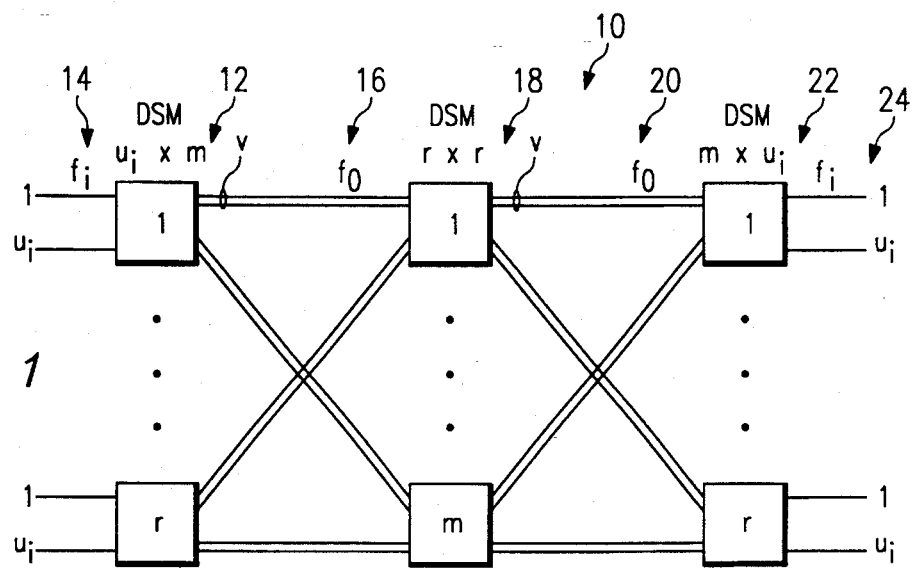
FIG. 1
FIG. 2
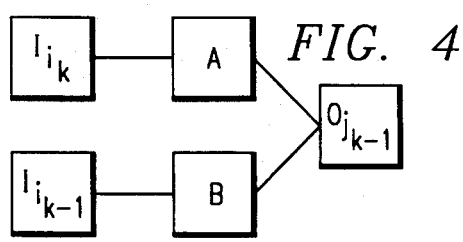
FIG. 4
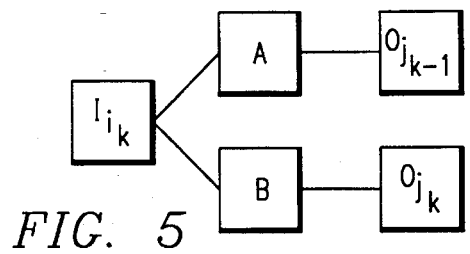
FIG. 5
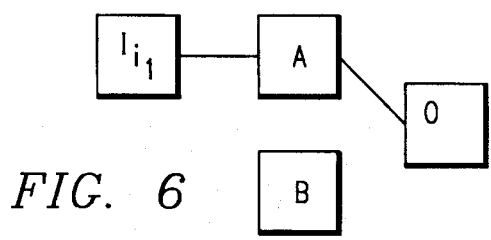
FIG. 6
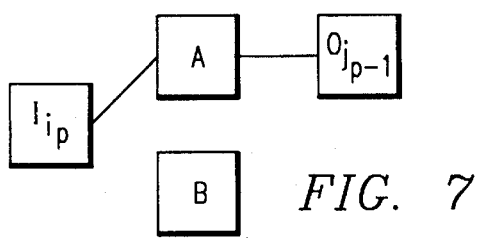
FIG. 7

90 link1-2

|  | $M_0$ | $M_1$ | $M_2$ | $M_3$ |
|---|---|---|---|---|
| $I_0$ | 2 | 2 | 2 | 1 |
| $I_1$ | 3 | 3 | 3 | 3 |
| $I_2$ | 2 | 2 | 1 | 3 |
| $I_3$ | 2 | 2 | 3 | 2 |

*FIG. 12*

100 link3-2

|  | $M_0$ | $M_1$ | $M_2$ | $M_3$ |
|---|---|---|---|---|
| $O_0$ | 3 | 3 | 3 | 3 |
| $O_1$ | 3 | 3 | 3 | 3 |
| $O_2$ | 3 | 3 | 3 | 2 |
| $O_3$ | 0 | 0 | 0 | 1 |

*FIG. 13*

102a in-out-mid [i] [j] [0]

|  | $O_0$ | $O_1$ | $O_2$ | $O_3$ |
|---|---|---|---|---|
| $I_0$ | 2 | 0 | 0 | 0 |
| $I_1$ | 1 | 2 | 0 | 0 |
| $I_2$ | 0 | 1 | 1 | 0 |
| $I_3$ | 0 | 0 | 2 | 0 |

*FIG. 14a*

102b in-out-mid [i] [j] [1]

|  | $O_0$ | $O_1$ | $O_2$ | $O_3$ |
|---|---|---|---|---|
| $I_0$ | 1 | 1 | 0 | 0 |
| $I_1$ | 1 | 1 | 1 | 0 |
| $I_2$ | 0 | 1 | 1 | 0 |
| $I_3$ | 1 | 0 | 1 | 0 |

*FIG. 14b*

102c in-out-mid [i] [j] [2]

|  | $O_0$ | $O_1$ | $O_2$ | $O_3$ |
|---|---|---|---|---|
| $I_0$ | 1 | 0 | 1 | 0 |
| $I_1$ | 0 | 1 | 2 | 0 |
| $I_2$ | 1 | 0 | 0 | 0 |
| $I_3$ | 1 | 2 | 0 | 0 |

*FIG. 14c*

102d in-out-mid [i] [j] [3]

|  | $O_0$ | $O_1$ | $O_2$ | $O_3$ |
|---|---|---|---|---|
| $I_0$ | 0 | 1 | 0 | 0 |
| $I_1$ | 2 | 0 | 0 | 1 |
| $I_2$ | 0 | 1 | 2 | 0 |
| $I_3$ | 1 | 1 | 0 | 0 |

*FIG. 14d*

CONNECTION TREE REARRANGEMENT METHOD AND SYSTEM FOR REARRANGEBLY-BLOCKED DSM NETWORKS

TECHNICAL FIELD OF THE INVENTION

The present invention relates generally to communication networks and more particularly to methods and systems for controlling communication networks. Even more specifically, the invention relates to a connection rearrangement method and system for switching communication networks including digital symmetrical matrices (DSM networks) that makes realizable otherwise unrealizable connection requests from input switch nodes to output switch nodes of the DSM networks.

BACKGROUND OF THE INVENTION

In recent years, communication networks have evolved to permit the commercially practical digital switching elements with combined time and space switching in the same chip or in the same printed circuit board. Communication networks that include such elements are called digital symmetrical matrix (DSM) networks. In a DSM network, information can be transferred from any channel of an incoming PCM link into any channel of an outgoing PCM link. P. Charransol, J. Haurl, C. Athensen, and D. Hardy, "Development of a Time Division Switching Network Usable in a Very Large Range of Capacities", IEEE Trans. Commun., vol. COM-27, No. 7, 1979, pp. 982–988, and A. Jajszczyk, "On Nonblocking Switching Networks Composed of Digital Symmetrical Matrices", IEEE Trans. Comm'n., Vol. COM-31, No. 1, 1983 describe blocking and non-blocking DSM networks of the type discussed herein.

One particularly interesting DSM network is the rearrangeably-blocked DSM network. A switching network is rearrangeable if its permitted states realize every assignment of inlets to outlets, or alternatively, if given any state x of the network, any inlet idle in x, and any outlet idle in x, there is a way of assigning new routes to the calls in progress in x so that the idle inlet can be connected to the idle outlet.

The DSM network may be described by the notation $J(m, v, f_o, u_i, f_i, r)$, where m is the number of middle switches, v is the number for group of PCM links between switches, $f_o$ and $f_i$ are numbers for the channels in a PCM link, $u_i$ is the number of PCM links, and r is the number of switches in the first and last stages. It has been shown that DSM network $J(m, v, f_o, u_i, f_i, r)$ is rearrangeable if and only if $$m \geq \left\lceil \frac{u_i f_i - 1}{v f_o} \right\rceil + 1.$$

The proof for the sufficiency of this condition is based on Hall's Theorem on distinct representatives of subsets and is, therefore, non-constructive. That is, this proof does not explain how to rearrange the rearrangeably-blocked DSM matrix in the event that this condition exists.

It is, therefore, an object of the present invention to provide an efficient rearrangement algorithm for rearrangeable DSM networks.

It is also an object of the present invention to provide a method and system that, for the DSM network $J(m, v, f_o, u_i, f_i, r)$ if $$m \geq \frac{u_i f_i}{v f_o},$$

then given a non-realizable connection request, the present invention presents certain existing connections that can always be so rearranged that the connection request becomes realizable after the rearrangement.

To perform rearrangement of the DSM network, it is an object of the present invention to provide a method and system for constructing a connection tree, such as an O-tree, an I-tree, a modified O-tree, and a modified I-tree for a rearrangeably-blocked digital symmetrical matrix (DSM) network, where the DSM network has a plurality of input switch nodes, a plurality of middle switches, and a plurality of output switch nodes, and where the connection tree provides at least one feasible node for use in a rearrangement method for connecting the input switch nodes to the output switch nodes through said middle switches. The connection tree constructing method includes the steps of receiving a plurality of parameters including a tree forming instruction for forming the connection tree as an I-tree or an O-tree, an input switch parameter associated with an identified input switch node, an output switch parameter associated with an identified output switch node, a first middle switch parameter for associating a first middle switch with the identified input switch node, and a second middle switch parameter for associating a second middle switch with the identified output switch node.

The method has the further step of designating all input switch nodes as unvisited input switch nodes and all output switches nodes of the DSM as unvisited output switch nodes. Next, the method determines whether the tree forming instruction is for forming an I-tree or an O-tree and stores the input switch parameter in a queue in the event that the tree forming instruction is for forming an I-tree. Alternatively, the present invention stores the output switch parameter in the queue in the event that the tree forming instruction is for forming an O-tree. The embodiment further makes the input switch parameter an I-tree root in the event that the tree forming instruction is for forming an I-tree or, alternatively, makes the output switch parameter an O-tree root in the event that the tree forming instruction is for forming an O-tree.

The next step is to remove a current node parameter from the queue which may be either an input switch parameter or an output switch parameter, and identify a set of feasible input switch nodes in the event that the current node parameter is an input switch parameter. This feasible input node identifying step includes the steps of labeling the identified input switch node as a feasible input node in the event that there is an idle channel from the identified input switch to the second middle switch and identifying all output switch nodes that connect through the second middle switch to the identified input switch node, in the event that there is no idle channel from the identified input switch to the second middle switch.

Then the method makes all unvisited input switch nodes children of the identified input switch node and places input switch parameters associated with the unvisited input switch nodes in the queue and designates the identified input switch node as a visited input node, as well as marks the identified input switch node as a visited input node. The method performs similar steps to find feasible output switch nodes in the event that the current node parameter is an output switch parameter. These steps are repeated as long as the queue contains at least one input switch node parameter or at least one output switch parameter.

It is a further object of the present invention to provide not only an efficient rearrangement algorithm for the DSM networks, but also a simple control algorithm for the communication network using the rearrangeable DSM network.

A further object of the present invention is to provide parallelized version of the rearrangement algorithm that runs in $O(\log r)$ steps on the CRCW (Concurrent-Read Concurrent-Write) PRAM model using only $O(\max(r^3,m))$ processors.

These and other objects will become apparent to the reader upon a reading and understanding of the following detailed description and claims.

BRIEF DESCRIPTION OF THE DRAWINGS

The invention and its modes of use and advantages are best understood by reference to the following description of illustrative embodiments when read in conjunction with the accompanying drawings wherein:

FIG. 1 provides a simplified schematic block diagram of a DSM network to illustrate the environment of the preferred embodiment;

FIG. 2 shows an exemplary matrix representation of a configuration of a DSM network;

FIGS. 4 through 8 illustrate abbreviated DSM network models to show the effects of connection tree construction performed according to the preferred embodiment;

FIGS. 12 through 14d provide data structure matrices that permit efficient implementation of the method and system of the preferred embodiment.

DETAILED DESCRIPTION OF THE PREFERRED EMBODIMENT

Figure 3:
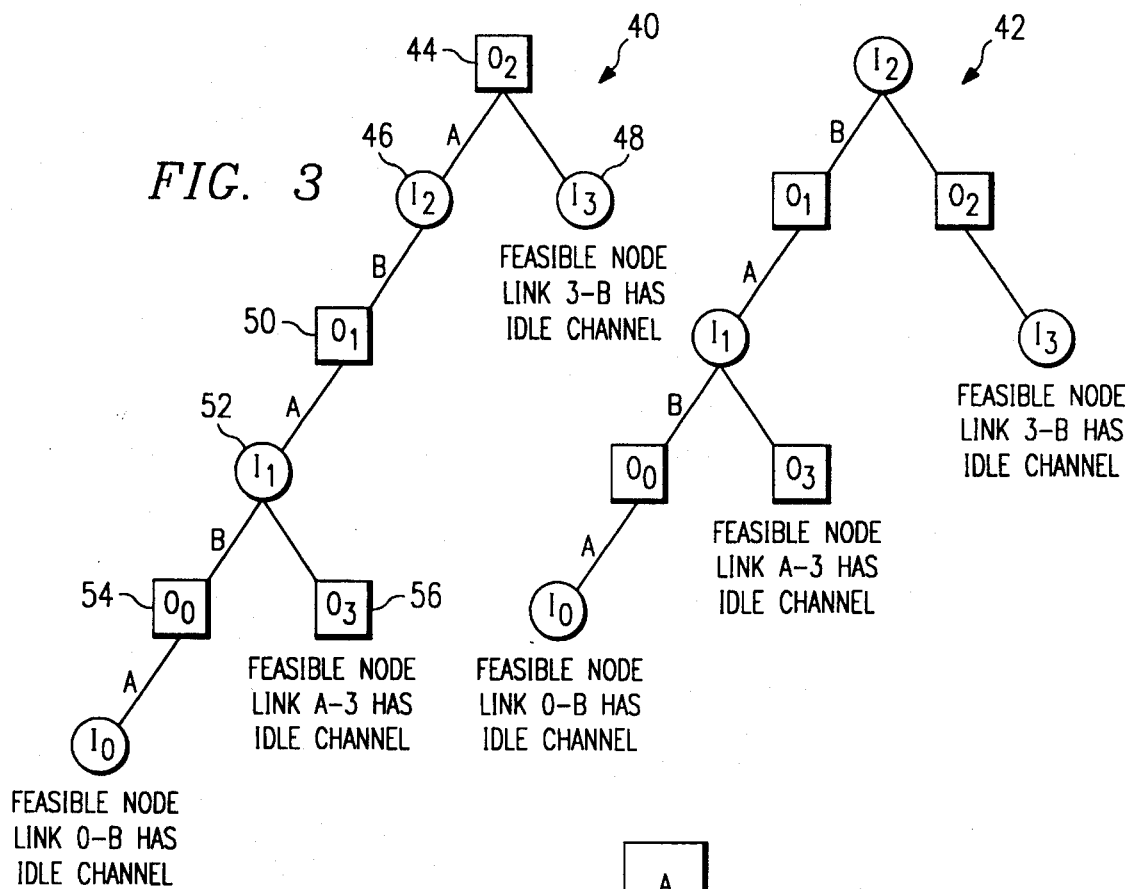
FIG. 3 shows an exemplary O-tree and I-tree for derived from the exemplary matrix representation of FIG. 2.

To describe in detail the preferred embodiment, it is necessary to first introduce some basic definitions concerning digital symmetrical matrix (DSM) networks and show how a configuration of a DSM network can be represented by a matrix that satisfies certain conditions. It is also important to interpret blocking conditions in terms of a matrix representation.

The three-state DSM network is as depicted in FIG. 1. DSM network 10 includes input switches 12 into which incoming links 14 connect. From input switches 12, links 16 connect to middle switches 18. Middle switches 18 connect through links 20 to output switches 22. Output switches 22 provide connections to outgoing links 24. In the following description, DSM network 10 will also be denoted by $J(m, v, f_o, u_i, f_i, r)$. The parameter m refers to the number of middle switches in the middle stage, 18 and r the number of input switches 12 and output switches 22. Let $J(m, v, f_o, u_i, f_i, r)$ be in a state (configuration) s. A "connection" from an input switch 12 designated with the letter I to an output switch 22 as designated with the letter O through a middle switch 18 designated with the letter M is denoted by a triple [I, M, O]. A connection [I, M, O] is said to be "free" if there exists a free channel between input switch I and middle switch M and output switch O. On such a free connection, information can be transferred from an idle inlet of input switch I to an idle outlet of output switch O through middle switch M using the free channels.

A "connection request" from an idle inlet of input switch I to an idle outlet of an output switch O is simply denoted by [I, O]. A connection request [I, O] is said to be "realizable" if and only if there exists a free connection [I, M, O] for some middle switch M. Such a connection is also called an M-connection from I to O.

The DSM network $J(m, v, f_o, u_i, f_i, r)$ is said to be "rearrangeable" if and only if for any configuration s of the network, any idle inlet x of input switch I, and any idle outlet y of output switch O in s, there is a way to rearrange the existing connections in the network so that the connection request [I, O] is realizable.

A configuration of DSM network 10 having the designation $J(m, v, f_o, u_i, f_i, r)$ in FIG. 1 can be represented by an r×r matrix N as follows: The r rows correspond to the r input switches 12 denoted by $I_0, I_1, \ldots, I_{r-1}$, whereas the r columns correspond to the r output switches 22 denoted by $O_0, O_1, \ldots, O_{r-1}$. This method of representing the configuration of DSM network 10 by matrices is useful in describing the idea of the rearrangement algorithm of the preferred embodiment. In the matrix, the entry in the i-th row and j-th column is denoted by $(I_i, O_j)$ or simply by (i, j). The entries of the matrix N contain symbols of the form $M.\lambda$. The entry $(I_i, O_j)$ contains the symbol $M.\lambda$ if and only if in configuration s there are exactly $\lambda$ (busy) connections of the form $[I_i, M, O_j]$. Thus, if the network changes from configuration s to s' by adding a new connection $[I_i, M, O_j]$, then the symbol $M.\lambda$ in entry $(I_i, O_j)$ changes to $M.(\lambda+1)$, accordingly. Similarly, if an existing connection $[I_i, M, O_j]$ is removed instead, then the symbol $M.\lambda$ in entry $(I_i, O_j)$ changes to $M.(\lambda-1)$.

FIG. 2 shows the matrix representation of a configuration of the network J(4, 1, 3, 4, 3, 4). In particular, matrix 30 includes four rows designated by reference numeral 32 and four columns designated, for example, by numeral 34. These four columns correspond to the four input switches 12 and four output switches 22. There are four middle switches 18 in the DSM network 10 that matrix 30 represents and one group of links between input switches 12 and middle switches 18 and between middle switches 18 and output switches 22. Furthermore, the illustrative example includes three channels i.e., the value of the $f_o, f_i$ parameters per link and four incoming and outgoing links for input switches 12 and output switches 22, respectively.

In order to utilize fully matrix 30 to represent the DSM network 10, it is necessary to construct certain rules concerning the representation it provides. It turns out that the matrices that represent valid configurations of DSM networks such as DSM network 10 must satisfy certain conditions. These conditions are formulated as Rules (1) and (2), below. Rule (1) requires that in matrix 30 for each row 32 having the designation i and for each column 34 having the designation j, and middle switch M, $$\left(\sum_{M,\lambda \text{ in row } i} \lambda \leq vf_o\right) \text{ and } \left(\sum_{M,\lambda \text{ in column } j} \lambda \leq vf_o\right).$$

This corresponds to the fact there are only $vf_o$ channels from any middle switch M to any input switch or output switch. Rule (2) requires that there can be no more than m distinct symbols in any entry (i,j). This corresponds to the fact that connections from any input switch 12 to any output switch 22 can go through at most the m middle switches 18. A matrix 30 with entries that satisfy Rules (1) and (2) is called legitimate and its entries are said to be legitimate.

Blocking conditions of DSM network 10 may be expressed in terms of the matrix 30 representation. Suppose that DSM network 10 is in some configuration which is represented by a matrix 30 with legitimate entries. Consider a connection request $[I_i, O_j]$. There are two ways in which such a connection request is not realizable. The first way that a connection request is not realizable is called a "trivially-blocked" condition. This condition is characterized by $$\left( \sum_{M,\lambda \text{ in row } i} \lambda = mvf_o \right) \text{ or } \left( \sum_{M,\lambda \text{ in column } j} \lambda = mvf_o \right).$$

This corresponds to the situation that all channels to input switch $I_i$ or all channels from output switch $O_j$, or both, are already busy. In such case, no connection from input switch $I_i$ to output switch $O_j$ can be made. The network is trivially blocked.

The second way in which a connection request is not realizable is properly called a "rearrangeably-blocked" condition. This happens when there is some free channel from input switch $I_i$ to a middle switch M. However, from any such middle switch M all channels from M to $O_j$ are busy. Similarly, there is some free channel from output switch $O_j$ to some middle switch M'. However, all channels between input switch $I_i$ and M' are busy. The fact that there is a free channel from input switch $I_i$ and a free channel from output switch $O_j$ can also be expressed by the inequalities $$\left( \sum_{M,\lambda \text{ in row } i} \lambda < mvf_o \right) \text{ and } \left( \sum_{M,\lambda \text{ in column } j} \lambda < mvf_o \right).$$

Thus, in this case there is no free connection $[I_i, M, O_j]$ for any middle switch M. If the network is rearrangeable, then the connection request $[I_i, O_j]$ becomes realizable after a rearrangement of the existing connections.

When rearranging existing connections in DSM network 10, only the middle switches 18 change. The input switches 12 and output switches 22 of these connections remain the same as before. In other words, for each entry $(I_i, O_j)$, the sum $$\sum_{M,\lambda \text{ in row } i \text{ and column } j} \lambda \quad (1)$$

is not affected by the rearrangement.

The rearrangement process can be thought of as a series of changes to the matrix in such a way that Rules (1) and (2) are not violated and for each entry (i,j) of the matrix, the sum in expression (1) remains the same before and after the rearrangement.

The present invention carries out its inventive concepts using certain data constructions called "connection trees" or, more particularly, "input trees" or "I-trees" and "output trees" or "O-trees". The notions of the I-tree and O-tree turn out to be useful in deriving the rearrangement algorithm of the preferred embodiment. To this end, let the DSM network 10 having the designation $J(m, v, f_o, u_i, f_i, r)$ be in some state s. Consider a connection request $[I_p, O_q]$ from input switch $I_p$ to output switch $O_q$. Suppose that this connection request is not realizable due to the rearrangeably-blocking condition. Then, there exist middle switches A and B such that there is a free channel from input switch $I_p$ to middle switch A and a free channel from middle switch B to output switch $O_q$. The I-tree and O-tree are constructed by calling the tree-construction algorithm of the preferred embodiment with the I-tree, $I_p$, $O_q$, A, and B set of parameters and also with the O-tree, $I_p$, $O_q$, A, and B set of parameters.

The tree-construction algorithm of the preferred embodiment is explained and described in detail in TABLE 1, below, using an easily translatable "pseudo" language. This pseudo language may be used to implement a computer program or a circuit that performs the described functions.

TABLE 1 tree-construction (T, $I_p$, $O_q$, A, B)
   if (T = I-tree) then
      Make $I_p$ the root of the I-tree and put $I_p$ into queue Q;
   if (T = O-tree) then
      Make $O_q$ the root of the O-tree and put $O_q$ into queue Q;
   Mark all input and output switch nodes unvisited;
   /* Build the tree T in a breadth-first manner as follows */
   while (queue Q is not empty) dobegin
      current-node = node removed from queue Q;
      if (current-node is $O_j$) then dobegin
         if ($\Sigma_{A,\lambda \text{ in column } j} \lambda < vf_o$) then
            /* There is an idle channel from A to $O_j$ */
            Make current-node a leaf and mark it feasible;
         elsebegin /* All channels from A to $O_j$ are busy */
            Search column $O_j$ to find all rows $I_{i_1}$,
               $1 \leq l \leq s_j$, such that entry ($I_{i_1}$,
               $O_j$) contains symbol A.$\lambda$;
            Make all unvisited input switch nodes
               children of current-node, and put them
               into queue Q;
         endelse
         Mark current-node $O_j$ visited;
      enddo
      if (current-node is $I_i$) then dobegin
         if ($\Sigma_{B,\lambda \text{ in row } i} \lambda < vf_o$) then
            /* There exists an idle channel from $I_i$ to B */
            Make current-node a leaf and mark it feasible;
         elsebegin /* All-channels from $I_i$ to B are busy */
            Search row $I_i$ to find all columns $O_{j_1}$,
               $1 \leq l \leq t_i$, such that entry ($I_i$,
               $O_{j_1}$) contains symbol B.$\lambda$;
            Make all unvisited output switch nodes
               children of current-node and put them
               into queue Q;
         endelse
         Mark current-node $I_i$ visited;
      enddo
   enddo/* of while loop*/
end /* of tree-construction */

It is helpful to understand this aspect of the preferred embodiment through an exemplary application of its inventive concepts. Therefore, FIG. 3 shows O-tree 40 and I-tree 42 obtained by executing the above tree-construction algorithm for the network J(4, 1, 3, 4, 3, 4) of FIG. 2 with (I, O)=(2, 2) and (A, B)=(0, 3). The following explains in detail how the tree-construction algorithm of TABLE 1 builds the appropriate O-tree. Building I-tree 42 proceeds in a very similar manner for this example.

Initially, the root 44 of O-tree 40 is output switch node $O_2$, so $O_2$ is put into queue Q. Next, $O_2$ is removed from queue Q. Since ($\Sigma_{A,\lambda \text{ in column } 2}\lambda=3$), it is apparent that for rows $I_2$ and $I_3$, the entries ($I_2$, $O_2$) and ($I_3$, $O_3$) of matrix 30 both contain a symbol of the form A.$\lambda$. As input switch 12 nodes $I_2$ and $I_3$ have not been visited, they are put into queue Q, as indicated by circles 46 and 48 which contain $I_2$ and $I_3$. After this, output switch 22 node $O_2$ is marked visited.

The next step is to remove current input switch 12 node $I_2$ from queue Q. Since ($\Sigma_{B,\lambda \text{ in row } 2}\lambda=3$), in columns $O_1$ and $O_2$ the entries ($I_2$, $O_1$) and ($I_2$, $0_2$) both contain a symbol of the form B.λ. Only output switch node $O_1$ is unvisited, so it is made a child of node $I_2$ and put into queue Q as indicated by box 50. Input switch node $I_2$ is marked visited.

The next iteration includes the step of removing the current input switch node $I_3$ from queue Q. Since ($\Sigma_{B.\lambda \text{ in row } 3}\lambda<3$), $I_3$ is marked feasible, and input switch node $I_3$ becomes visited as FIG. 3 indicates. At this point, queue Q contains only $O_1$. The next step of this example is to remove current output switch node $O_1$ from queue Q. As before, because ($\Sigma_{A.\lambda \text{ in column } 1}\lambda=3$), for the rows $I_1$ and $I_2$, the entries ($I_1$, $O_1$) and ($I_2$, $O_1$) both contain a symbol of the form A.λ. As $I_2$ has already been visited, only input switch node $I_1$ is made a child of node $O_l$ and put into queue Q as circle 52 indicates. Output switch node $O_1$ is then marked visited. Queue Q now contains only $I_1$.

Current input switch node $I_1$ is then removed from queue Q. Again, since ($\Sigma_{B.\lambda \text{ in row } 1}\lambda=3$), a search in row 1 takes place for symbols of the form B.λ which are contained in entries ($I_1,O_0$) and ($I_1$, $O_3$). As output switch nodes $O_0$ and $O_3$ have not been visited before, they are made children of node $I_1$, and put into queue Q. Boxes 54 and 56 show this step. Input switch $I_1$ is then marked visited. At this point, queue Q contains $O_0$ and $O_3$.

Next, the current output switch node $O_0$ is removed from queue Q. Since ($\Sigma_{A.\lambda \text{ in column } 0}\lambda=3$), row $I_0$ and $I_1$ the entries ($I_0$, $O_0$) and ($I_1$, $O_0$) are found to contain symbols of the form A.λ. As only input switch node $I_0$ is unvisited, $I_0$ is made a child of output switch node $O_0$ and put into queue Q (see circle 58), which now contains $O_3$ and $I_0$. Output switch node $O_0$ is marked visited.

The process then continues by the removing current output switch node $O_3$ from queue Q. Because ($\Sigma_{A.\lambda \text{ in column } 3}\lambda<3$), $O_3$ is marked feasible, and output switch node $O_3$ is marked visited. FIG. 3 annotates this step. Queue Q contains only $I_0$ after this step. Finally, current input switch node $I_0$ is removed from queue Q. Again, since ($\Sigma_{3.\lambda \text{ in row } 0}\lambda<3$), input switch node $I_0$ is marked feasible and visited, as FIG. 3 also shows. At this point, queue Q becomes empty and the algorithm terminates.

Assuming that the conditions ($\Sigma_{A.\lambda \text{ in column } j}\lambda<vf_0$) and ($\Sigma_{B.\lambda \text{ in row } i}\lambda<vf_0$) can be verified in O(1) steps, the tree-construction algorithm of TABLE 1 can be shown to possess numerous attractive technical features.

One feature is that the tree-construction algorithm of the preferred embodiment runs in $O(r^2)$ steps. This is understood by first noting that all the nodes in the I-tree such as I-tree 42 (or in the O-tree such as O-tree 42) are distinct. Therefore, the I-tree (O-tree) has ≦2r nodes. Each node can branch to at most r nodes in the next level. Hence, it takes at most $O(r^2)$ steps to construct an I-tree (O-tree).

Another attractive feature of the tree-construction algorithm of the preferred embodiment is that it makes certain non-realizable connection requests realizable. That is, suppose the DSM network 10, as designated by J(m, v, $f_o$, $u_i$, $f_i$, r), is in a configuration s. Let [I, O] be a connection request. Let A and B be middle switches 18 for which there is a free channel 16 from input switch I to A, and a free channel from B to output switch O. If the O-tree or I-tree constructed by the tree-construction algorithm of the preferred embodiment contains a feasible node, then the A and B connections can be so rearranged that the connection request [I, O] becomes realizable.

The reasons this second aspect of tree-construction algorithm exists are explained as follows. By symmetry of the network, the result holds for the I-tree as well. However, it is only necessary to discuss the case of the O-tree. Consider the path from the root of the O-tree to some feasible node. This path gives rise to a sequence of A-connections and B-connections of the form $$[O, A, I_{i_1}] \to [I_{i_1}, B, O_{j_1}] \to [O_{j_1}, A, I_{i_2}] \to \ldots \to [P_l, M_l, Q_l] \quad (2)$$

where the middle symbols of consecutive triples alternate between A and B, and the third symbol of a triple coincides with the first symbol of the next triple. Note that there are at least two such triples in sequence (2).

Consider two consecutive triples on the path. They are of the form:

$$[I_{i_{k-1}}, B, O_{j_{k-1}}] \to [O_{j_{k-1}}, A, I_{i_k}] \text{ or } [O_{j_{k-1}}, A, I_{i_k}] \to [I_{i_k}, B, O_{j_k}]$$

So when swapping two consecutive connections, i.e., an A-connection followed by a B-connection, or vice versa, the channels of the A-connections are swapped with the channels of the B-connection, or vice versa. FIGS. 4 and 5 show these connection paths. This corresponds to changing the middle symbol A to B and the middle symbol B to A, respectively. Suppose that this is performed for all triples in sequence (2), above. That is, suppose that every middle symbol A is changed to B, and every middle symbol B to A. It is only necessary to show that the rearrangement caused by this operation can be done and that the connection request [I, O] becomes realizable after this rearrangement.

For this understanding, it is important to distinguish two cases of sequence (2). In the first case, suppose that sequence (2) contains an odd number of connections, i.e., the last connection is an A-connection of the form [$P_l$, $M_l$, $Q_l$]=[$O_{j_{p-1}}$, A, $I_{i_p}$]. First note that it is possible to change the first A-connection to a B-connection because there is an idle channel from B to output switch O. FIG. 6 depicts this situation. Secondly, it is also possible to change the last connection [$O_{j_{p-1}}$, A, $I_{i_p}$] to a B-connection since input switch node $I_{i_p}$ is feasible, i.e., there is an idle channel from $I_{i_p}$ to B. FIG. 7 illustrates this circumstance. Thus, the rearrangement of all connections in sequence (2) can be done. Moreover, after this rearrangement, connection [I, A, O] becomes free, and hence, connection request [I, O] becomes realizable.

Figure 8:
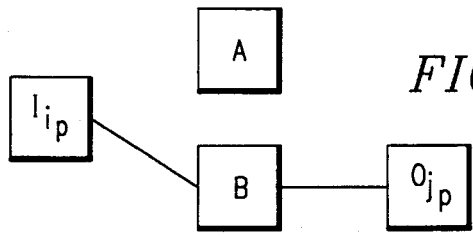

The second case of sequence (2) is that it contains an even number of connections, i.e., the last connection is a B-connection of the form [$P_l$, $M_l$, $Q_l$]=[$I_{i_p}$, B, $O_{j_p}$]. This case appears in FIG. 8. Arguing as in the first case, it is easy to see that the last connection [$I_{i_p}$, B, $O_{j_p}$] can be changed to an A-connection so that the rearrangement can be done and connection request [I, O] becomes realizable. Therefore, if the O-tree or the I-tree constructed by the tree-construction algorithm of the preferred embodiment generates a feasible node, then the A and B connections can be so arranged to make the connection realizable.

The tree-construction algorithm of the preferred embodiment makes realizable certain otherwise nonrealizable DSM network 10 connections, by showing how to rearrange the matrix. The following discussion, therefore, describes certain aspects of the rearrangeability of DSM networks that pertain to the preferred embodiment. For the DSM network 10 as described by $$J(m,v,f_o,u_i,f_i,r),m \geq \frac{u_i f_i}{v f_o}$$

is a necessary and sufficient condition for its rearrangeability. Moreover, a simple rearrangement algorithm will be given for the "if" part. This contrasts with the result explained in A. Jajszczyk, "Rearrangeable Switching Networks Composed of Digital Symmetrical Matrices," *Proc. IEEE Mediterranean Electrotech. Conf.*, Athens, Paper A4.11, 1983. That work obtains a similar bound by a nonconstructive proof using Hall's Theorem on distinct representatives of subsets. Also, for the rearrangeable DSM network J(m, v, $f_o$, $u_i$, $f_i$, r), the number of connections to be rearranged is $\leq r-1$ in order to realize any connection request. The following discussion explains these properties.

First, consider the rearrangeability of DSM network 10. It can be stated that, the DSM network J(m, v, $f_o$, $u_i$, $f_i$, r) is rearrangeable if and only if $$m \leq \frac{u_i f_i}{v f_o}.$$ (3)

Moreover, the preferred embodiment provides a rearrangement algorithm for the "if" part of this statement. To understand this relationship, it is only necessary to explain the "if" part of the above statement. To this end, suppose that condition (3) holds. Let [I, O] be a connection request from input switch I to output switch O. Let A and B be middle switches such that there is an idle channel from input switch I to middle switch A, and an idle channel from middle switch B to output switch O. To show that the network can be so rearranged that connection request [I, O] becomes realizable, it is only necessary to show that either the O-tree or the I-tree constructed by the tree-construction algorithm of the preferred embodiment has feasible nodes. In fact, to show that both the I-tree and O-tree contain feasible nodes, by symmetry of the network, it is only necessary to show that the I-tree contains a feasible node.

The existence of a feasible node in the I-tree can be shown using a logical contradiction analysis. To this end, suppose that an I-tree exists in which all the leaves branch to nodes that have been visited before. Consider the sub-network 60 of FIG. 9 and having the designation W (as a sub-graph) obtained by those middle switches 18 labeled A, B, and input switches 12 and output switches 18 that are nodes in the I-tree.

Since there are no feasible nodes, for middle switch A, there are no idle channels in the links from A to $O_{j_r}$, $1 \leq r \leq n$. The number of busy channels going out of A to the output switches $O_{j_r}$ is therefore $nvf_0$. Each of the $nvf_0$ channels going out of middle switch A has to be connected to some channel in a link from some input switch $I_{i_r}$, $1 \leq r \leq k$, to A. Therefore, $$k \geq n.$$ (4)

Similarly, for the middle switch B, there is no idle channel in any link from input switches $I_{i_r}$, $1 \leq r \leq k$, to B. The number of busy channels going out of the input switches $I_{i_r}$ is $kvf_0$. Each of the $kvf_0$ channels going into middle switch B has to be connected to some channel in a link from B to some $O_{j_r}$, $1 \leq r \leq n$. Therefore, $$n \geq k.$$ (5)

Figure 9:
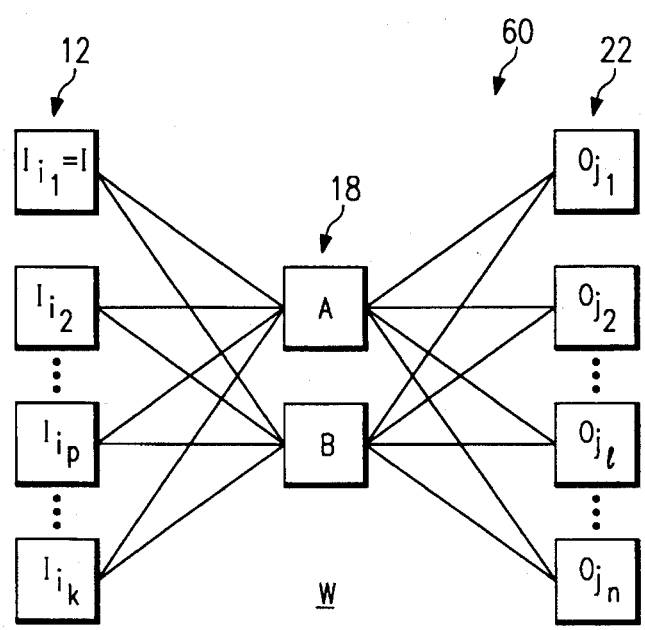
FIG. 9 shows a sub-network of the DSM network to illustrate a technical advantage of the preferred embodiment.

Conditions (4) and (5) imply that k=n, and hence, all the links in the sub-network W in FIG. 9 do not have any idle channels. This is, however, a contradiction, because a link from input switch I to middle switch A does contain an idle channel. Since this contradiction exists, condition (3) is both a necessary and sufficient condition for the rearrangeability of DSM network 10.

Note that A. Jajszczyk, "Rearrangeable Switching Networks Composed of Digital Symmetrical Matrices", *Proc. IEEE Mediterranean Electrotech. Conf.*, Athens, Paper A4.11, 1983, explains that a necessary and sufficient condition for the rearrangeability of the DSM network described by J(m, v, $f_o$, $u_i$, $f_i$, r) is that:

$$m \geq \lfloor \frac{u_i f_i - 1}{v f_o} \rfloor + 1,$$ (6)

where $\lfloor z \rfloor$ denotes the largest integer $\leq z$. It is clear that this condition is the same as described above. However and very importantly, the preferred embodiment provides a constructive explanation that includes an effective rearrangement algorithm.

Another important aspect of the method of the preferred embodiment is that the value r=1 is an upper bound for the number of connections that need to be rearranged in order to realize a connection request in the DSM network 10 described by J(m, v, $f_o$, $u_i$, $f_i$, r). The following discussion explains this aspect of the preferred embodiment. Let [I, O] be a connection request from input switch I to output switch O. Let A and B be middle switches so chosen as to obtain an idle channel from input switch I to middle switch A and an idle channel from middle switch B to output switch O. In order to do the rearrangement, it is only necessary to consider a path from the root to a feasible node in the I-tree or O-tree. The number of connection rearrangements is then the length of such a path. Thus, the next step is to show that there is a path to a feasible node of length $\leq r-1$.

Figure 10:
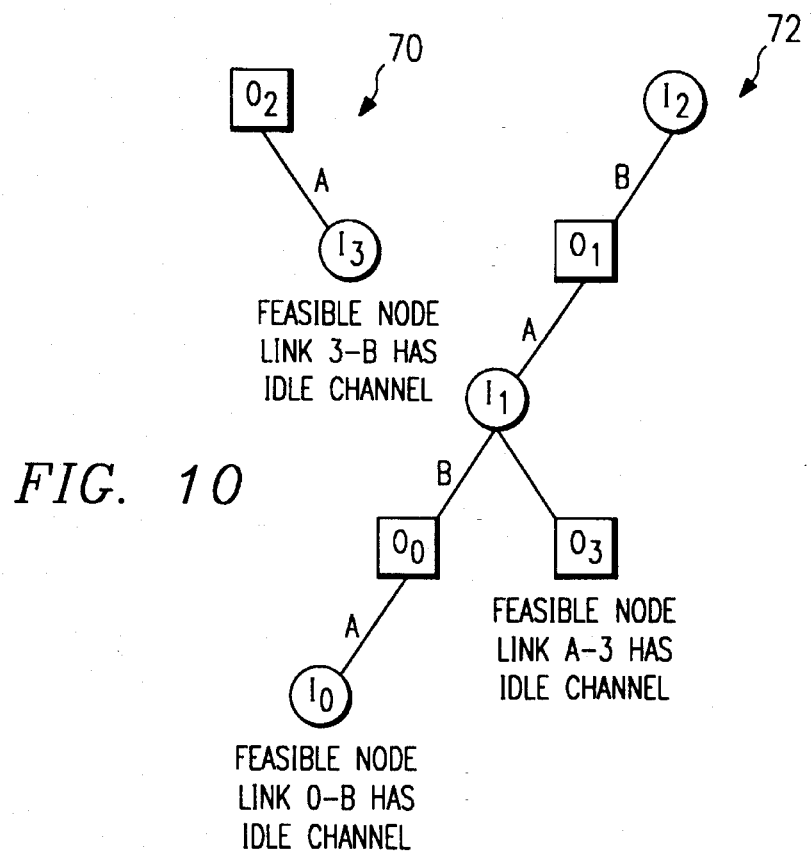
FIG. 10 provides a modified O-tree and modified I-tree to illustrate a further technical advantage of the preferred embodiment.

To this end, consider the simultaneous construction of the I-tree and O-tree, which is performed level-by-level starting with the roots of both trees at level 1. In performing the tree-construction method of the preferred embodiment to construct the I-tree and O-tree level-by-level simultaneously, a first step is to mark an input switch or output switch node visited if it is visited while growing the I-tree or O-tree. In general, the I-tree and O-tree obtained in this way are not the same as previously defined. So, these I-trees and O-trees shall hereinafter be called "modified I-trees" and "modified O-trees." For instance, the modified I-tree and modified O-tree of the example of FIGS. 2 and 3 are depicted in FIG. 10. In particular, modified O-tree 70 and modified I-tree 72 of FIG. 10 correspond to O-tree 40 and I-tree 42 of FIG. 3. An algorithm to construct the modified I-tree and O-tree will be described below.

An important property of the modified I-tree 72 and modified O-tree 70 construction is that, as was the case for the original tree-construction algorithm, given DSM network 10 depicted by J(m, v, $f_o$, $u_i$, $f_i$, r), if $$m \geq \frac{u_i f_i}{v f_o},$$ (7)

the modified I-tree or the modified O-tree contains a feasible node. The explanation of this property is similar to the one relating to condition (3), above, and may be understood by considering the sub-network obtained from those input switches 12 and output switches 22 that appear as nodes in the modified I-tree 72 and modified O-tree 70. The rest of the explanation follows directly from the explanation relating to condition (3).

Another technical advantage of the preferred embodiment is that using modified I-trees and modified O-trees places an upper bound on the number of connections rearrangements. That is, for the rearrangeable DSM network J(m, v, $f_o$, $u_i$, $f_i$, r), the number of connections that need to be rearranged in order to realize a connection request is $\leq r-1$. This is readily understood through the following explanation.

Let [I, O] be a connection request from input switch I to output switch O. Let A and B be middle switches 18 so chosen as to obtain an idle channel 16 from input switch I to middle switch A and an idle channel 20 from middle switch B to output switch O. In order to do the rearrangement, it is only necessary to consider a path from the root to a feasible node in the modified I-tree or O-tree. The number of connection rearrangements is, then, its length. Thus, it is only necessary to show that in the modified I-tree or modified O-tree, there is a feasible node at level $\leq r$, where the roots are at level 1. To this end, suppose that in constructing the modified I-tree and modified O-tree simultaneously, the first feasible node is found at level k. The existence of such a feasible node is guaranteed by the property relating to condition (7), i.e., that the modified I-tree or modified O-tree contains a feasible node.

It is also true that for each i, $1 \leq i \leq k-1$, there are at least two new nodes at level i that have not appeared in levels 1, ..., i−1. Inductive reasoning illustrates this property. That is, with a basis at i=1, input switch node I and output switch node O, as roots of the modified I-tree and O-tree, are two new nodes. Using logical induction, suppose that the modified I-tree and O-tree have been constructed up to level i, $1 \leq i \leq k-2$, and that there are for each level j, $1 \leq j \leq i$, at least two new nodes that have not appeared in levels 1, ..., j−1. Consider, then, the construction of level i+1 of the modified I-tree and O-tree. To show that there are at least two new nodes at level i+1 that have not appeared in levels 1, ..., i, it is necessary to distinguish two cases.

The first case is of there being no new node at level i+1. In this case, the simultaneous execution of the tree-construction algorithm of the preferred embodiment to construct the modified I-tree and modified O-tree would have terminated at level i. Therefore, none of the modified I-tree and O-tree has a feasible node. This contradiction forces the result that there is a new node at level i+1.

Figure 11:
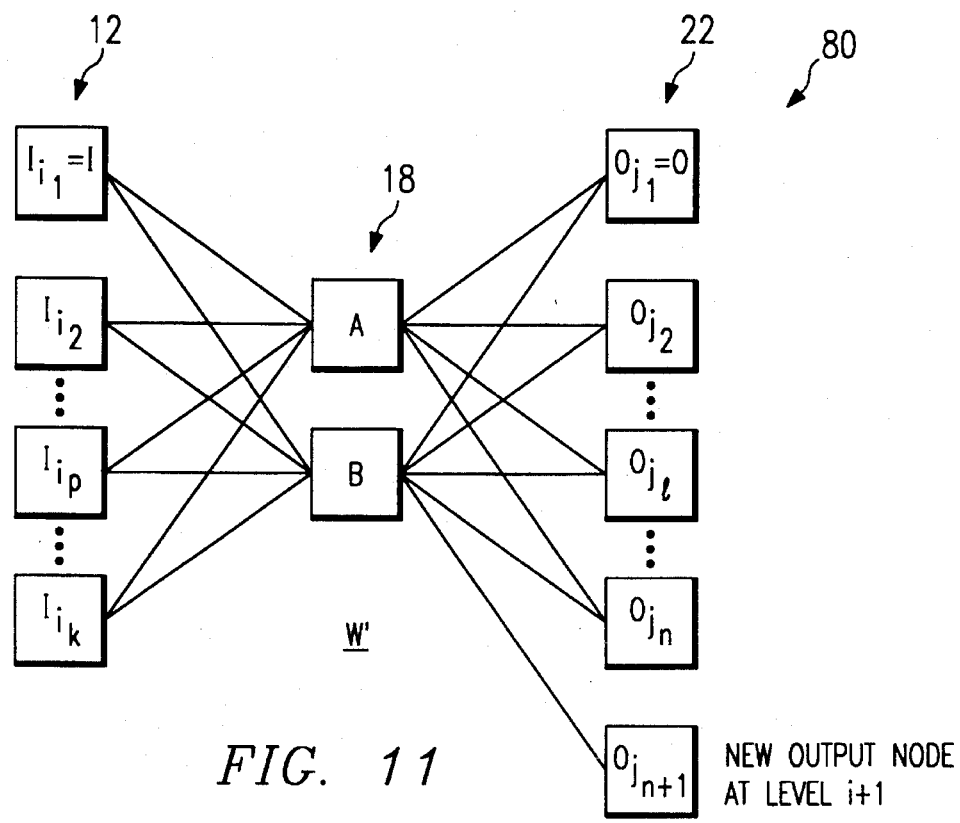
FIG. 11 shows further a sub-network of a DSM network to show another technical aspect of the preferred embodiment.

The next case is that there is only one new node at level i+1. By symmetry, it may assumed without loss of generality, that the new node at level i+1 is an output node, denoted by $O_{j_{n+1}}$. Consider the sub-network W' obtained from middle switches A, B and the input switches 12 and output switches 22 that appear as nodes in the modified I-tree and O-tree from level 1 through level i+1. This sub-network W' is depicted as sub-network 80 of FIG. 11. Since there are no feasible nodes at levels 1, ..., i+1, all the links from middle switch A to output switches $O_{j_r}$, $1 \leq r \leq n$ do not have any idle channel. Thus, the same condition as in condition (3), above, results, i.e., $$k \geq n+1 \quad (8)$$

Similarly, all the links from input switches $I_{i_r}$, $1 \leq r \leq k$, to middle switch B do not have any idle channels either. Therefore, we have $$n+1 \geq k+1 \quad (9)$$

Obviously, (8) and (9) imply $k \geq k+1$. Because of this contradiction, there must be, for each i, $1 \leq i \leq k-1$, at least two nodes at level i that have not appeared in levels 1, ..., i−1.

From the above, it follows that k (the level where the first feasible node was found in the simultaneous construction of the modified I-tree and modified O-tree) must be $\leq r$. Indeed, an even stronger result holds. Let a be the number of output switches to each of which there is no idle channel from A, and b be the number of input switches from each of which there is no idle channel to B. It is true that the number of connections that need to be rearranged in order to realize the connection request [I, O] is $\leq \min(a,b)$. To this end, it is only necessary to show that $k \leq \min(a,b)+1$.

Without loss of generality, let a=min (a,b). Let $O_{i_1}, ..., O_{i_a}$ be the output switches to each of which there is no idle channel from A. Now, if k>a+1, then all the output switches $O_{i_1}, ..., O_{i_a}$ must have been visited during the construction of the first a levels. So, if there is no feasible node at level a+1, then at this level, output switch nodes have been visited before and input switch nodes branch to output switch nodes that have been visited before also. This implies that no modified I-tree or modified O-tree has a feasible node. This contradiction means that the number of connections that need to be rearranged must be $\leq \min(a,b)$.

Finally, since $a \leq r-1$, $k \leq r$, and this can only mean that for the rearrangeable DSM network described by $J(m, v, f_o, u_i, f_i, r)$, the number of connections that need to be rearranged in order to realize a connection request is $\leq r-1$. Understanding this aspect of the preferred embodiment follows immediately from the explanation of why r−1 is an upper bound on the number of connections that need to be rearranged in order to realize a connection request through DSM network 10.

The upper bound r−1 is a worst-case bound. If the middle switches A and B are chosen carefully, then it is possible to lower the number of connection rearrangements, as shown above. However, the bound r−1 is tight in that for the special case of the Clos networks, there exist configurations such that r−1 connection rearrangements are necessary in order to realize a connection request.

Yet other properties relate to the use of the preferred embodiment with DSM network 10. Let the rearrangeable DSM network $J(m, v, f_o, u_i, f_i, r)$ be in some configuration s. Let [I, O] be a connection request from input switch I to output switch O. Let A and B be middle switches chosen for the rearrangement so that there is an idle channel from input switch I to middle switch A and an idle channel from middle switch B to output switch O. Further, let a be the number of output switches to each of which there is no idle channel from A and let b be the number of input switches from each of which there is no idle channel to B. In this case, then, the number of connections that need to be rearranged in order to realize the connection request [I, O] is $\leq \min(a,b)$. Understanding this aspect of the preferred embodiment follows immediately from the explanation of why r−1 is an upper bound on the number of connection that need to be rearranged in order to realize a connection request through DSM network 10.

With the above description of the preferred embodiment, it is helpful to further understand its inventive concepts through a description its operation for tree construction, DSM network rearrangement, and DSM network control. This detailed description further described these aspects below.

OPERATION

The operation as a whole of the preferred embodiment is well understood by illustration of an efficient implementation of tree-construction method and system. In order to detect efficiently the non-realizability of a connection request and to search faster for entries in row i matrix 30 that contain symbols of the form B.λ and entries in column j of a matrix such as for symbols of the form A.λ, it is helpful to use the data structures of FIGS. 12 through 14d.

FIG. 12 shows a data structure in the form of two-dimensional r×m matrix 90 for the path link1-2. The connections link 1-2[i][j]=λ if and only if there are λ busy channels in the links from input switch i to middle switch j. FIG. 13 provides a data structure in the form of two-dimensional r×m matrix 100 for the path link3-2. The connections through DSM network 10 of link3-2[k][j]=λ if and only if there are λ busy channels between middle switch j and output switch k. Furthermore, the three-dimensional r×r×m matrix 102 for the in-out-mid connection path appears as matrices 102a through 102d in FIGS. 14a through 14d, respectively. Similarly, the connections in-out-mid[i][k][j]=λ if and only if there are exactly λ busy connections from input switch i to output switch k through middle switch j. This set of four two-dimensional arrays 102a through 102d correspond to four middle switches to represent the three-dimensional matrix in-out-mid that collectively use the reference numeral 102.

Using the 3-dimensional r×r×m matrix in-out-mid 102 of FIGS. 14a through 14d to search for entries in row i that have symbols of the form B.λ can now be done by fixing i and B and looking for those k's with in-out-mid [i][k][B]>0. Similarly, searching for entries in column k that have symbols of the form A.λ can now be done by fixing k and A and looking for i's with in-out-mid [i][k][A]>0.

With these data structures, it is possible to refine the tree-construction algorithm of the preferred embodiment to obtain the algorithm I-O-tree-construction of TABLE 2 which constructs the modified I-tree and O-tree level-by-level simultaneously. Algorithm I-O-tree-construction stops at the first level that contains a feasible node. In the worst case, this algorithm has the same time complexity as the tree-construction algorithm of TABLE 1, i.e., $O(r^2)$.

TABLE 2

I-O-tree-construction ($I_p$, $O_q$, A, B)
　Make $O_q$ the root of the modified O-tree and put
　　$O_q$ into queue Q;
　Make $I_p$ the root of the modified I-tree and put $I_p$ into
　　queue Q;
　Mark all input and output switch nodes unvisited;
　feasible-node = not-found;
　/* Build the modified I-tree and O-tree simultaneously as
　follows */
　while (feasible-node = not-found) dobegin
　　current-node = node removed from queue Q;
　　if (current-node is $O_k$) then dobegin
　　　if (link3 − 2 [$O_k$][A] < $vf_o$) then dobegin
　　　　/* There is an idle channel from A to $O_k$ */
　　　　Make current-node a leaf and mark it feasible;
　　　　feasible-node = found; break;
　　　enddo
　　　elsebegin /* All channels from A to $O_k$ are busy */
　　　　for (i = 0; i < r; i = i + 1)
　　　　　if ($I_i$ is marked visited) then continue
　　　　　elsebegin
　　　　　　if (in-out-mid [$I_i$][$O_k$][A] > 0) then
　　　　　　　Put $I_i$ into queue Q;
　　　　　　　Make $I_i$ a child of $O_j$;
　　　　　endelse
　　　endelse
　　　Mark current output node $O_j$ visited;
　　enddo
　　if (current-node is $I_i$) then dobegin
　　　if (link3 − 2[$I_i$][B] < $vf_o$) then dobegin
　　　　/* There is an idle channel from $I_i$ to B */
　　　　Make current-node a leaf and mark it feasible;
　　　　feasible-node = found; break;
　　　enddo
　　　elsebegin /* All channels from $I_i$ to B are busy */
　　　　for (j = 0; j < r; j = j + 1)
　　　　　if (j is marked visited) then continue
　　　　　elsebegin
　　　　　　if (in-out-mid [$I_i$][$O_j$][B] > 0) then
　　　　　　　Put $O_j$ into queue Q;
　　　　　　　Make $O_j$ a child of $I_i$;
　　　　　endelse
　　　endelse
　　　Mark current input node $I_i$, visited;
　　enddo
　enddo /* while loop */

TABLE 2-continued end /* I-O-tree-construction */

As was the case with the pseudo language of TABLE 1, the algorithm of TABLE 2 may be implemented in a computer language for operation on any computer system compatible with DSM network 10 control circuitry or may be implemented in other electronic circuitry for this. Either implementation is fully within the scope of the present invention.

Having described both an algorithm for performing the method and system of DSM network connection tree construction, the preferred embodiment also encompasses a method and system for rearranging the DSM network 10 to execute rearrangement and a control method for controlling DSM network 10 rearrangement. In particular, TABLE 3 describes a simple network control algorithm for the DSM network 10 having the description J(m, v, $f_o$, $u_i$, $f_i$, r).

TABLE 3

Control-alg (request, I, O)
　step C1 /* Disconnection request */
　if (request = disconnection) then
　　update all data; return;
　step C2 /* Connection request */
　if (request = connection) then dobegin
　　/* Check for normal connection */
　　for (M=0; M<m; M=M+1)
　　　if ((link1 − 2[I][M]<$vf_o$) and
　　　(link3 − 2[O][M]<$vf_o$)) then
　　　　update all data for the new connection;
　　　　return;
　　/* Check for trivial blocking condition */
　　trivial-block-flag = TRUE;
　　for (M=0; M<m; M=M+1)
　　　if (link1 − 2[I][M]<$vf_o$) then
　　　　trivial-block-flag = FALSE; break;
　　if (trivial-block-flag = TRUE) then return;
　　trivial-block-flag = TRUE;
　　for (M=O; M<m; M=M+1)
　　　if (link3 − 2[O][M]<$vf_o$) then
　　　　trivial-block-flag = FALSE; break;
　　if (trivial-block-flag = TRUE) then return;
　　/* Rearrangeably-blocking condition */
　　invoke Rearrangement-alg (I, O);
　　update all data for the new connection;
　enddo /* end of step C2 */
end/* Control-alg */

To implement the I-O tree construction method of either TABLE 1 or TABLE 2 pursuant to the control algorithm of TABLE 3, TABLE 4 provides the following rearrangement algorithm of the preferred embodiment:

TABLE 4

Rearrangement-alg (I, O)
　Step R1
　　/* Find middle switches A and B for rearrangement */
　　for (M=0; M<m; M=M+1) dobegin
　　　if (link1 − 2[I][M]<$vf_o$) then A=M;
　　　if (link3 − 2[O][M]<$vf_o$) then B=M;
　　　enddo
　Step R2
　　Call I-O-tree-construction (I, O, A, B);
　Step R3
　　Rearrange the A-connections and B-connections
　　obtained from the path from I or O to first-found
　　feasible node;
end /* Rearrangement-alg */

These control and rearrangement methods include numerous technical advantages. One important technical advantage of the control algorithm of TABLE 3 is that it has time complexity $O(max(r^2, m))$. Another technical advantage of the control algorithm of TABLE 3 and the rearrangement method of TABLE 4 is that for the special case of Clos networks, i.e., $v=1, f_o=1, f_i=1$, it takes $O(\max(r, m))$ time to do rearrangement. This may be seen by observing that in the case of Clos networks, the modified I-tree and O-tree take the form of a linear tree (i.e., a path). Therefore, algorithm I-O-tree-construction takes only $O(r)$ steps. Hence, the rearrangement algorithm runs in $O(\max(r,m))$ time.

With the tree construction algorithms of the preferred embodiment it is also possible to perform a parallel rearrangement algorithm. The preferred embodiment, therefore, includes a method and system to parallelize the algorithms derived in preceding sections to obtain a parallel rearrangement algorithm for the DSM network described by $J(m, v, f_o, u_i, f_i, r)$. The parallel rearrangement algorithm takes $O(\log r)$ time to execute on the model of the Concurrent-Read Concurrent-Write Parallel Random Access Machine (CRCW PRAM) using $O(\max(r^3, m))$ processors. For this purpose, A. Gibbons and W. Rytter, *Efficient parallel Algorithms* (Cambridge Univ. Press 1987), provides a description of the CRCW PRAM model. That description is incorporated hereby reference. The preferred embodiment applies the technique of doubling in the area of parallel computation.

The present parallel rearrangement algorithm makes use of several data structures. Two of the data structures are $2r \times 2r$ Boolean matrices labeled MAT0 and MAT1. The 2r rows (columns) of these matrices correspond to the 2r input and output switches, and are labeled as $I_0, I_1, \ldots, I_{r-1}, O_0, O_1, \ldots, O_{r-1}$. In the MAT0 and MAT1 matrices, entry [M,L] is 1 if and only if there is a path from switch M to switch L, where $M, L \in \{I_1, \ldots, I_r, I_1, \ldots, O_r\}$. Suppose that at an instant of time, MAT0 [M, L]=1 if and only if there is a path of length $\leq 2^k$ from M to L for some k. Then, by an iteration, it is possible to compute the matrix MAT1 so that MAT1 [M, L]=1 if and only if there is a path of length $\leq 2^{k+1}$ from switch M to switch L. The roles of MAT0 and MAT1 then swap.

Another set of data structures of the parallel rearrangement algorithm are the $2r \times 2r$ matrices $R^k$, where $0 \leq k \leq \lfloor \log r \rfloor$. This data structure is similar to MAT0 and MAT1 in that the 2r rows and columns of $R^k$ correspond to the input and output switches labeled as $I_1, \ldots, I_r, O_1, \ldots, O_r$. The entries of $R^k$ contain symbols from $\{I_1, \ldots, I_r, O_1, \ldots, O_r\}$. The expression, $R^h[K][L]=M$ means that there is a path of length at most $2^{k+1}$ from K to L that is constructed by paths from K to M, and from M to L of length at most $2^k$.

Note that initially, in matrix MAT0, entry $[I_i, O_j]=1$ if and only if there is a connection from input switch $I_i$ to output switch $O_j$ through middle switch B. Similarly, entry $[O_j, I_i]=1$ if and only if there is a connection from output switch $O_j$ to input switch $I_i$ through middle switch A. The remaining entries of MAT0 and all entries of MAT1 are 0 initially.

Column $I_i$ of MAT0 and MAT1 is marked feasible if there exists an idle channel from $I_i$ to B. Similarly, column $O_j$ of MAT0 and MAT1 is marked feasible if there exists an idle channel from A to $O_j$. To verify whether a column of MAT0 and MAT1 is feasible, it is only necessary to look at the matrices link1-2 and link3-2 of FIGS. 12 and 13. The parallel rearrangement algorithm, then, is as follows:

TABLE 5 parallel-rearrangement (I, O)
 Step 1:

TABLE 5-continued

/* Choose middle switches A and B */
for all middle switches M in parallel dobegin
    if (link1 − 2[I][M] < $vf_O$) then A=M;
    if (link3 − 2[O][M] < $vf_O$) then B=M;
    enddo
Step 2:
/* Initialize MAT0 and MAT1 and mark feasible columns */
MAT-flag=1;
/* MAT-flag indicates which of MAT0, MAT1 contains
current information */
for all M, L ∈ {$I_1, \ldots, I_r, O_1, \ldots, O_r$} in parallel dobegin
    MAT0 [M, L]=MAT1 [M, L]=0;
    if [$I_i$, B, $O_j$] is a connection from $I_i$ to $O_j$ through B then
        MAT0 [$I_i, O_j$]=1;
    if [$O_j$, A, $I_i$] is a connection from $O_j$ to $I_i$ through A then
        MAT0 [$O_j, I_i$] = 1;
    enddo
for all M ∈ {$I_1, \ldots, I_r, O_1, \ldots, O_r$} in parallel do
    if M is a feasible node then mark column M feasible;
Step 3:
for all (k=1; k ≤ $\lfloor \log r \rfloor$ +1; k=k+1) dobegin
    for all K, L, M ∈ {$I_1, \ldots, I_r, O_1, \ldots, O_r$} in
    parallel dobegin
        if (MAT-flag=1 and MAT0[K][L]=1 and
        MAT0[L][M]=1) then
            /* Compute MAT1 from MAT0 */
            MAT1[K][M]=1; $R^{k-1}$[K][M]=L;
        if (MAT-flag=0 and MAT1[K][L]=1 and
        MAT1[L][M]=1) then
            /* Compute MAT0 from MAT1 */
            MAT0[K][M]=1; $R^{k-1}$[K][M]=L;
    enddo
    if (MAT-flag=0) then dobegin
        /* Check if there is a path to feasiblecolumn in
        MAT0 */
        for all L ∈ {$I_1, \ldots, I_r, O_1, \ldots, O_r$} in
        parallel dobegin
            if (MAT0[O][L]=1 and L is feasible) then
                root=O, feasible-node=L; level=k; break;
            if (MAT0[I][L]=1 and L is feasible) then
                root=I; feasible-node=L; level=k; break;
        enddo
        /* For next iteration, clear MAT0 and set MAT-flag
        accordingly */
        MAT-flag=1
        for all K, M ∈ {$I_1, \ldots, I_r, O_1, \ldots, O_r$} in
        parallel do
            MAT0[K][M]=0;
        enddo
    elsebegin /* Check if there is a path to feasiblecolumn
    in MAT1 */
        for all L ∈ {$I_1, \ldots, I_r, O_1, \ldots, O_r$} in
        parallel dobegin
            if (MAT1[O][L]=1 and L is feasible) then
                root=O, feasible-node=L; level=k; break;
            if (MAT1[I][L]=1 and L is feasible) then
                root=I; feasible-node=L; level=k; break;
        enddo
        /* For next iteration, clear MAT1 and set MAT-flag
        accordingly */
        MAT-flag=0;
        for all K, M ∈ {$I_1, \ldots, I_r, O_1, \ldots, O_r$} in
        parallel dobegin
            MAT1[K][M]=0;
        enddo
Step 4:
/* Construct the path of length at most $2^k$ with
root and feasible node obtained from step 3 */
$N_1^k$=root; $N_2^k$=feasible-node;
for (l=k; l>0; l=l-1) dobegin
    for all two consecutive nodes ($N^l{}_j$, $N^l{}_j+1$)
    of the path at level l
    ($N^l{}_1, N^l{}_2, \ldots, N^l{}_p$) in parallel dobegin
        if ($R^{l-1}[N^l{}_j][N^l{}_j+1]$ is not equal to $N^l{}_j$ or
        $N^l{}_j+1$) then
            Insert node $R^{l-1}[N^l{}_j][N^l{}_j+1]$ between $N^l{}_j$
            and $N^l{}_{j-1}$;
    enddo TABLE 5-continued

```
    enddo
Step 5:
    Using the path found in Step 4, swap the A-connections and
    B-connections to complete the rearrangement process.
end /* parallel-rearrangement algorithm */
```

An attractive property of the parallel-rearrangement algorithm of TABLE 4 is that it correctly computes a path from input switch node I or output switch node O to a feasible node of length $O(r)$, and rearranges the network $J(m, v, f_o, u_i, f_i, r)$ so that connection request [I, O] becomes realizable. On the CRCW PRAM, the parallel-rearrangement algorithm runs in $O(\log r)$ steps using $O(\max(r^3, m))$ processors. This is true because, although the path from the input switch node I or output switch node O to a feasible node produced by the parallel-rearrangement algorithm is not necessarily a path in the modified I-tree or O-tree, it is easy to see that such a path of length $O(r)$ exists. This path can be used to rearrange the DSM network 10 described by $J(m, v, f_o, u_i, f_i, r)$ so that the connection request [I, O] becomes realizable.

To understand that the parallel-rearrangement algorithm runs in $O(\log r)$ steps using $O(\max(r^3, m))$ processors, it is important to analyze steps 1–5 of the algorithm. Step 1 requires $O(1)$ time using $O(m)$ processors, where write conflicts are resolved by letting the lowest-numbered processor succeed. In step 2, the feasibility of an input switch node or an output switch node can be verified in $O(1)$ time. So step 2 runs in $O(1)$ time using $O(r^2)$ processors. The outer loop of step 3 is iterated $O(\log r)$ times. By assigning to each triple (K, L, M) a processor, it is easy to see that each iteration can be performed in $O(1)$ time. Clearly, the number of processors used is $O(r^3)$. Similarly, the outer for loop of step 4 is iterated for $O(\log r)$ times each of which takes $O(1)$ time using $O(r^2)$ processors. Finally, it is obvious that step 5 runs in $O(1)$ time using $O(r)$ processors. Thus, the parallel-rearrangement algorithm of the preferred embodiment runs in $O(\log r)$ time using $O(\max(r^3, m))$ processors.

Therefore, the present invention addresses the rearrangeability of the DSM network 10 that may be described as $J(m, v, f_o, u_i, f_i, r)$. One important aspect of the preferred embodiment is an efficient rearrangement algorithm of $O(r^2)$ time complexity. A feature of this algorithm is the $r-1$ upper bound for the number of connections rearrangements. This result is tight in that for the special case of the Clos network, i.e., $v=f_o=f_i=1$, it is known that there exists a configuration for which $r-1$ connections rearrangements are necessary in order to realize a connection request.

The preferred embodiment, in summary, includes a method and system for constructing a connection tree, such as an O-tree, an I-tree, a modified O-tree, and a modified I-tree for a rearrangeably-blocked digital symmetrical matrix (DSM) network, where the DSM network has a plurality of input switch nodes, a plurality of middle switches, and a plurality of output switch nodes, and where the connection tree provides at least one feasible node for use in a rearrangement method for connecting the input switch nodes to the output switch nodes through said middle switches. The connection tree constructing method includes the steps of receiving a plurality of parameters including a tree forming instruction for forming the connection tree as an I-tree or an O-tree, an input switch parameter associated with an identified input switch node, an output switch parameter associated with an identified output switch node, a first middle switch parameter for associating a first middle switch with the identified input switch node, and a second middle switch parameter for associating a second middle switch with the identified output switch node.

The method has the further step of designating all input switch nodes as unvisited input switch nodes and all output switches nodes of the DSM as unvisited output switch nodes. Next, the method determines whether the tree forming instruction is for forming an I-tree or an O-tree and stores the input switch parameter in a queue in the event that the tree forming instruction is for forming an I-tree. Alternatively, invention stores the output switch parameter in the queue in the event that the tree forming instruction is for forming an O-tree. The embodiment further makes the input switch parameter an I-tree root in the event that the tree forming instruction is for forming an I-tree or, alternatively, makes the output switch parameter an O-tree root in the event that the tree forming instruction is for forming an O-tree.

The next step is to remove a current node parameter from the queue which may be either an input switch parameter or an output switch parameter, and identify a set of feasible input switch nodes in the event that the current node parameter is an input switch parameter. This feasible input node identifying step includes the steps of labeling the identified input switch node as a feasible input node in the event that there is an idle channel from the identified input switch to the second middle switch and identifying all output switch nodes that connect through the second middle switch to the identified input switch node, in the event that there is no idle channel from the identified input switch to the second middle switch.

Then the method makes all unvisited input switch nodes children of the identified input switch node and places input switch parameters associated with the unvisited input switch nodes in the queue and designates the identified input switch node as a visited input node, as well as marks the identified input switch node as a visited input node. The method performs similar steps to find feasible output switch nodes in the event that the current node parameter is an output switch parameter. These steps are repeated as long as the queue contains at least one input switch node parameter or at least one output switch parameter.

This process may be modified to terminate at the first feasible node for an I-tree or an O-tree. Also, both a rearrange method and system and a DSM network control method and system may be formed using either the I-tree and O-tree construction process or the modified I-tree and modified O-tree construction process. Furthermore, a parallel rearrangement algorithm is provided to even further enhance the technical advantages of the present invention.

Although the invention has been described with reference to the above-specified embodiments, this description is not meant to be construed in a limiting sense. Various modifications of the disclosed embodiment, as well as alternative embodiments of the invention will become apparent to persons skilled in the art upon reference to the above description. It is therefore, contemplated that the appended claims will cover such modifications that fall within the true scope of the invention.

What we claim is:

1. A method for constructing a connection tree for a rearrangeably-blocked digital symmetrical matrix network, said digital symmetrical matrix network comprising a plurality of input switch nodes, a plurality of middle switches, and a plurality of output switch nodes, said connection tree for use in a rearrangement method for connecting said input switch nodes to said output switch nodes through said middle switches, said connection tree constructing method comprising the steps of:

receiving a plurality of parameters, including a tree forming instruction for forming said connection tree as an input tree or an output tree, an input switch parameter associated with an identified input switch node, an output switch parameter associated with an identified output switch node, a first middle switch parameter for associating a first middle switch with said identified input switch node, and a second middle switch parameter for associating a second middle switch with said identified output switch node;

designating all input switch nodes as unvisited input switch nodes and all output switches nodes of said digital symmetrical matrix network as unvisited output switch nodes;

determining whether said tree forming instruction is for forming an input tree or an output tree and storing said input switch parameter in a queue when said tree forming instruction is for forming an input tree, or, alternatively, storing said output switch parameter in said queue when said tree forming instruction is for forming an output tree;

making said input switch parameter an input tree root when said tree forming instruction is for forming an input tree or, alternatively, making said output switch parameter an output tree root when said tree forming instruction is for forming an output tree;

(a) removing a current node parameter from said queue, said current node parameter being either an input switch parameter or an output switch parameter;

(b) identifying a set of feasible input switch nodes when said current node parameter is an input switch parameter, said feasible input node identifying circuitry further comprising:
  (1) labeling said identified input switch node as a feasible input node when there is an idle channel from said identified input switch to said second middle switch;
  (2) identifying all output switch nodes connecting through said second middle switch to said identified input switch node, when there is no idle channel from said identified input switch to said second middle switch; and
    (a) making all unvisited output switch nodes children of said identified input switch node and placing output switch parameters associated with said unvisited output switch nodes in said queue; and
    (b) designating said identified input switch node as a visited input node; and
  (3) marking said identified input switch node as a visited input node; and (c) identifying a set of feasible output switch node when said current node parameter is an output switch parameter, said feasible output node identifying circuitry further comprising:
  (1) labeling said identified switch node as a feasible output node when there is an idle channel from said identified output switch to said first middle switch;
  (2) identifying all input switch nodes connecting through said first middle switch to said identified output switch node, when there is no idle channel from said identified output switch to said first middle switch; and
    (a) making all unvisited input switch nodes children of said identified output switch node and placing input switch parameters associated with said unvisited output switch nodes in said queue; and
    (b) designating said identified output switch node as a visited output node; and
  (3) marking said identified output switch node as a visited output node; and repeating circuitry for repeating steps (b) and (c) while said queue contains at least one input switch node parameter or at least one output switch parameter.

2. A system for constructing a connection tree for a rearrangeably-blocked digital symmetrical matrix network, said digital symmetrical matrix network comprising a plurality of input switch nodes, a plurality of middle switches, and a plurality of output switch nodes, said connection tree for use in a rearrangement method for connecting said input switch nodes to said output switch nodes through said middle switches, said connection tree constructing system comprising:

parameter receiving circuitry for receiving a plurality of parameters, including a tree forming instruction for forming said connection tree as an input tree or an output tree, an input switch parameter associated with an identified input switch node, an output switch parameter associated with an identified output switch node, a first middle switch parameter for associating a first middle switch with said identified input switch node, and a second middle switch parameter for associating a second middle switch with said identified output switch node;

designating circuitry for designating all input switch nodes as unvisited input switch nodes and all output switches nodes of said digital symmetrical matrix network as unvisited output switch nodes;

means for determining whether said tree forming instruction is for forming an input tree or an output tree and storing said input switch parameter in a queue when said tree forming instruction is for forming an input tree, or, alternatively, storing said output switch parameter in said queue when said tree forming instruction is for forming an output tree;

root forming circuitry for making said input switch parameter an input tree root when said tree forming instruction is for forming an input tree or, alternatively, making said output switch parameter an output tree root when said tree forming instruction is for forming an output tree;

(a) means for removing a current node parameter from said queue, said current node parameter being either an input switch parameter or an output switch parameter;

(b) feasible input switch node identifying circuitry for identifying a set of feasible input switch nodes when said current node parameter is an input switch parameter, said feasible input node identifying circuitry further comprising:
  (1) said feasible input switch node identifying circuitry comprising labeling means for labeling said identified input switch node as a feasible input node when there is an idle channel from said identified input switch to said second middle switch;
  (2) said input switch node identifying circuitry further comprising circuitry for identifying all output switch nodes connecting through said second middle switch to said identified input switch node, when there is no idle channel from said identified input switch to said second middle switch; and
    (a) means for making all unvisited output switch nodes children of said identified input switch node and placing output switch parameters associated with said unvisited output switch nodes in said queue; and (b) means for designating said identified input switch node as a visited input node; and (3) marking circuitry for marking said identified input switch node as a visited input node; and (c) feasible output switch node identifying circuitry for identifying a set of feasible output switch nodes when said current node parameter is an output switch parameter, said feasible output node identifying circuitry further comprising:

(1) said feasible output switch node identifying circuitry comprising labeling means for labeling said identified output switch node as a feasible output node when there is an idle channel from said identified output switch to said first middle switch;

(2) said output switch node identifying circuitry further comprising circuitry for identifying all input switch nodes connecting through said first middle switch to said identified output switch node, when there is no idle channel from said identified output switch to said first middle switch; and (a) means for making all unvisited input switch nodes children of said identified output switch node and placing input switch parameters associated with said unvisited output switch nodes in said queue; and (b) means for designating said identified output switch node as a visited output node; and (3) making circuitry for marking said identified output switch node as a visited output node; and repeating circuitry for repeating steps (b) and (c) while said queue contains at least one input switch node parameter or at least one output switch parameter.

3. A method for constructing a modified connection tree for a rearrangeably-blocked digital symmetrical matrix network, said digital symmetrical matrix network comprising a plurality of input switch nodes, a plurality of middle switches, and a plurality of output switch nodes, said connection tree for use in a rearrangement method for connecting said input switch nodes to said output switch nodes through said middle switches, said modified connection tree constructing method comprising the steps of:

receiving a plurality of parameters, including a tree forming instruction for forming said connection tree as a modified input tree or a modified output tree, an input switch parameter associated with an identified input switch node, an output switch parameter associated with an identified output switch node, a first middle switch parameter for associating a first middle switch with said identified input switch node, and a second middle switch parameter for associating a second middle switch with said identified output switch node;

designating all input switch nodes as unvisited input switch nodes and all output switches nodes of said digital symmetrical matrix network as unvisited output switch nodes;

determining whether said tree forming instruction is for forming a modified input tree or a modified output tree and storing said input switch parameter in a queue when said tree forming instruction is for forming a modified input tree, or, alternatively, storing said output switch parameter in said queue when said tree forming instruction is for forming a modified output tree;

making said input switch parameter a modified input tree root when said tree forming instruction is for forming a modified input tree or, alternatively, making said output switch parameter a modified output tree root when said tree forming instruction is for forming a modified output tree;

(a) removing a current node parameter from said queue, said current node parameter being either an input switch parameter or an output switch parameter;

(b) identifying a set of feasible input switch nodes when said current node parameter is an input switch parameter, said feasible input node identifying step further comprising the steps of:

(1) labeling said identified input switch node as a feasible input node when there is an idle channel from said identified input switch to said second middle switch;

(2) identifying all output switch nodes connecting through said second middle switch to said identified input switch node, when there is no idle channel from said identified input switch to said second middle switch; and (a) making all unvisited output switch nodes children of said identified input switch node and placing output switch parameters associated with said unvisited input switch nodes in said queue; and (b) designating said identified input switch node as a visited input node; and (3) marking said identified input switch node as a visited input node; and (c) identifying a set of feasible output switch nodes when said current node parameter is an output switch parameter, said feasible output node identifying step further comprising the steps of:

(1) labeling said identified output switch node as a feasible output node when there is an idle channel from said identified output switch to said first middle switch;

(2) identifying all input switch nodes connecting through said first middle switch to said identified output switch node, when there is no idle channel from said identified output switch to said first middle switch; and (a) making all unvisited input switch nodes children of said identified output switch node and placing input switch parameters associated with said unvisited output switch nodes in said queue; and (b) designating said identified output switch node as a visited output node; and (3) marking said identified output switch node as a visited output node; and terminating steps (b) and (c) when either step (b) or step (c) generates an feasible node for said digital symmetrical matrix network.

4. A system for constructing a modified connection tree for a rearrangeably-blocked digital symmetrical matrix network, said digital symmetrical matrix network comprising a plurality of input switch nodes, a plurality of middle switches, and a plurality of output switch nodes, said connection tree for use in a rearrangement method for connecting said input switch nodes to said output switch nodes through said middle switches, said modified connection tree constructing system comprising:

parameter receiving circuitry for receiving a plurality of parameters, including a tree forming instruction for forming said connection tree as a modified input tree or a modified output tree, an input switch parameter associated with an identified input switch node, an output switch parameter associated with an identified output switch node, a first middle switch parameter for associating a first middle switch with said identified input switch node, and a second middle switch parameter for associating a second middle switch with said identified output switch node;

designating circuitry for designating all input switch nodes as unvisited input switch nodes and all output switches nodes of said digital symmetrical matrix network as unvisited output switch nodes;

means for determining whether said tree forming instruction is for forming a modified input tree or a modified output tree and storing said input switch parameter in a queue when said tree forming instruction is for forming a modified input tree, or, alternatively, storing said output switch parameter in said queue when said tree forming instruction is for forming a modified output tree;

root forming circuitry for making said input switch parameter an input tree root when said tree forming instruction is for forming an input tree or, alternatively, making said output switch parameter an output tree root when said tree forming instruction is for forming an output tree;

(a) means for removing a current node parameter from said queue, said current node parameter being either an input switch parameter or an output switch parameter;

(b) feasible input switch node identifying circuitry for identifying a set of feasible input switch nodes when said current node parameter is an input switch parameter, said feasible input node identifying circuitry further comprising:

(1) said feasible input switch node identifying circuitry comprising labeling means for labeling said identified input switch node as a feasible input node when there is an idle channel from said identified input switch to said second middle switch;

(2) said input switch node identifying circuitry further comprising circuitry for identifying all output switch nodes connecting through said second middle switch to said identified input switch node, when there is no idle channel from said identified input switch to said second middle switch; and (a) means for making all unvisited output switch nodes children of said identified input switch node and placing output switch parameters associated with said unvisited input switch nodes in said queue; and (b) means for designating said identified input switch node as a visited output input node; and (3) marking circuitry for marking said identified input switch node as a visited input node; and (c) feasible output switch node identifying circuitry for identifying a set of feasible output switch nodes when said current node parameter is an output switch parameter, said feasible output node identifying circuitry further comprising:

(1) said feasible output switch node identifying circuitry comprising labeling means for labeling said identified output switch node as a feasible output node when there is an idle channel from said identified output switch to said first middle switch;

(2) said output switch node identifying circuitry further comprising circuitry for identifying all input switch nodes connecting through said first middle switch to said identified output switch node, when there is no idle channel from said identified output switch to said first middle switch; and (a) means for making all unvisited input switch nodes children of said identified output switch node and placing input switch parameters associated with said unvisited output switch nodes in said queue; and (b) means for designating said identified output switch node as a visited output node; and (3) making circuitry for marking said identified output switch node as a visited output node; and terminating steps (b) and (c) when either step (b) or step (c) generates an feasible node for said digital symmetrical matrix.

5. A system for controlling a communications network comprising digital symmetrical matrices, said system comprising the steps of:

determining circuitry for determining an occurrence of a connection request to alter connections between at least one input switch nodes and at least one output switch nodes of the digital symmetrical matrix network;

generating means for generating a disconnect signal for disconnecting certain ones of said at least one input switch nodes from said at least one output switch nodes when said request is a disconnection request;

determining circuitry for determining whether responding to said connection request produces either a normal connection condition, a trivially-blocked condition, or a rearrangeably-blocked condition in said digital symmetrical matrix when said request is a connection request;

normal connection signal generating circuitry for generating a normal connection signal when said connection request produces a normal connection condition;

trivially-blocked signal generating circuitry for generating a trivially-blocked signal when said connection request produces a trivially-blocked condition; and rearrangement signal generating circuitry for generating a rearrangement signal for activating produces a rearrangement system comprising a connection tree construction system when said connection request a rearrangeably-blocked condition.

6. A method for rearranging a rearrangeably-blocked digital symmetrical matrix communications network to connect a requested input switch node to a requested output switch node of said digital symmetrical matrix network, said method comprising the steps of:

identifying a first middle switch of said rearrangeably-blocked digital symmetrical matrix network for connecting to said requested input switch node and a second middle switch of said rearrangeably-blocked digital symmetrical matrix for connecting to said requested output switch node;

constructing an input tree and an output tree for finding a set of feasible nodes from either said first middle switch or said second middle switch for connecting said requested input switch node to said requested output switch node said set of feasible node finding step further comprising the steps of identifying a set of feasible input switch nodes and identifying a set of feasible output switch nodes, said identifying steps further comprising the steps of:

(a) identifying a set of feasible input switch nodes when said current node parameter is an input switch parameter, said feasible input node identifying circuitry further comprising:

(1) labeling said identified input switch node as a feasible input node when there is an idle channel from said identified input switch to said second middle switch;

(2) identifying all output switch nodes connecting through said second middle switch to said identified input switch node, when there is no idle channel from said identified input switch to said second middle switch; and
   (a) making all unvisited output switch nodes children of said identified input switch node and placing output switch parameters associated with said unvisited output switch nodes in said queue; and
   (b) designating said identified input switch node as a visited input node; and
(3) marking said identified input switch node as a visited input node; and
(b) identifying a set of feasible output switch node when said current node parameter is an output switch parameter, said feasible output node identifying circuitry, further comprising:
(1) labeling said identified switch node as a feasible output node when there is an idle channel from said identified output switch to said first middle switch;
(2) identifying all input switch nodes connecting through said first middle switch to said identified output switch node, when there is no idle channel from said identified output switch to said first middle switch; and
   (a) making all unvisited input switch nodes children of said identified output switch node and placing input switch parameters associated with said unvisited output switch nodes in said queue; and
   (b) designating said identified output switch node as a visited output node; and
(3) marking said identified output switch node as a visited output node; and
rearranging said rearrangeably-blocked digital symmetrical matrix network according to said feasible nodes.

7. A system for rearranging a rearrangeably-blocked digital symmetrical matrix communications network to connect a requested input switch node to a requested output switch node of said digital symmetrical matrix, comprising:

identifying circuitry for identifying a first middle switch of said rearrangeably-blocked digital symmetrical matrix for connecting to said requested input switch node and a second middle switch of said rearrangeably-blocked digital symmetrical matrix network for connecting to said requested output switch node;

means for constructing an input tree and an output tree for finding a set of feasible nodes from either of said first middle switch or said second middle switch for connecting said requested input switch node to said requested output switch node said constructing means further comprising means for identifying as said feasible nodes a set of feasible input switch nodes and a set of feasible output switch nodes, said identifying means comprising means for:

(a) identifying a set of feasible input switch nodes when said current node parameter is an input switch parameter, said feasible input node identifying circuitry further comprising:
(1) labeling said identified input switch node as a feasible input node when there is an idle channel from said identified input switch to said second middle switch;
(2) identifying all output switch nodes connecting through said second middle switch to said identified input switch node, when there is no idle channel from said identified input switch to said second middle switch; and
   (a) making all unvisited output switch nodes children of said identified input switch node and placing output switch parameters associated with said unvisited output switch nodes in said queue; and
   (b) designating said identified input switch node as a visited input node; and
(3) marking said identified input switch node as a visited input node; and
(b) identifying a set of feasible output switch node when said current node parameter is an output switch parameter, said feasible output node identifying circuitry further comprising:
(1) labeling said identified switch node as a feasible output node when there is an idle channel from said identified output switch to said first middle switch;
(2) identifying all input switch nodes connecting through said first middle switch to said identified output switch node, when there is no idle channel from said identified output switch to said first middle switch; and
   (a) making all unvisited input switch nodes children of said identified output switch node and placing input switch parameters associated with said unvisited output switch nodes in said queue; and
   (b) designating said identified output switch node as a visited output node; and
(3) marking said identified output switch node as a visited output node; and rearranging means for rearranging said rearrangeably-blocked digital symmetrical matrix according to said feasible nodes.

* * * * *